US010710343B2

(12) United States Patent
Johnson et al.

(10) Patent No.: US 10,710,343 B2
(45) Date of Patent: Jul. 14, 2020

(54) COEXTRUDED POLYMER FILM CONFIGURED FOR SUCCESSIVE IRREVERSIBLE DELAMINATION

(71) Applicant: 3M INNOVATIVE PROPERTIES COMPANY, St. Paul, MN (US)

(72) Inventors: Stephen A. Johnson, Woodbury, MN (US); Onur S. Yordem, St. Paul, MN (US); Timothy J. Lindquist, Woodbury, MN (US); Terence D. Neavin, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/390,621

(22) Filed: Apr. 22, 2019

(65) Prior Publication Data

US 2019/0248117 A1   Aug. 15, 2019

Related U.S. Application Data

(63) Continuation of application No. 13/596,425, filed on Aug. 28, 2012, now abandoned.

(51) Int. Cl.
*B32B 27/08* (2006.01)
*B29D 7/01* (2006.01)
(Continued)

(52) U.S. Cl.
CPC .............. *B32B 27/08* (2013.01); *B29C 55/12* (2013.01); *B29D 7/01* (2013.01); *B32B 7/06* (2013.01);
(Continued)

(58) Field of Classification Search
CPC .. B32B 7/06; B32B 27/06; B32B 7/36; B32B 27/32; B32B 2250/42; B32B 2250/05;
(Continued)

(56) References Cited

U.S. PATENT DOCUMENTS 4,770,320 A   9/1988 Miles
4,907,825 A   3/1990 Miles
(Continued)

FOREIGN PATENT DOCUMENTS

EP   1312470      5/2003
JP   06-143496    5/1994
(Continued)

OTHER PUBLICATIONS

Joesph Dooley and Harvey Tung, "Co-Extrusion" Encyclopedia of Polymer Science and Technology, vol. 2, p. 1-25. Oct. 21, 2001 (Year: 2001).*
(Continued)

*Primary Examiner* — Michael Zhang

(57) ABSTRACT

Multilayered polymer films are configured so that successive constituent layer packets can be delaminated in continuous sheet form from the remaining film. The new films are compatible with known coextrusion manufacturing techniques, and can also be made without the use of adhesive layers between layer packets that are tailored to be individually peelable from the remainder of the film. Instead, combinations of polymer compositions are used to allow non-adhesive polymer layers to be combined in such a way that delamination of the film is likely to occur along a plurality of delamination surfaces corresponding to interfaces between particular pairs of layers for which the peel strength is reduced relative to the peel strength at other layer interfaces within the film. The absence of an adhesive between peelable layer packets results in the delamination being irreversible.

14 Claims, 5 Drawing Sheets

(51) Int. Cl.

| | | |
|---|---|---|
| *B29C 55/12* | (2006.01) | |
| *B32B 7/06* | (2019.01) | |
| *B32B 27/32* | (2006.01) | |
| *B32B 27/36* | (2006.01) | |
| *B29C 48/08* | (2019.01) | |
| *B29C 48/18* | (2019.01) | |
| *B29C 48/21* | (2019.01) | |
| *B29C 48/23* | (2019.01) | |

(52) U.S. Cl.
CPC .............. *B32B 27/32* (2013.01); *B32B 27/36* (2013.01); *B29C 48/08* (2019.02); *B29C 48/185* (2019.02); *B29C 48/21* (2019.02); *B29C 48/23* (2019.02); *B29K 2995/0032* (2013.01); *B32B 2250/05* (2013.01); *B32B 2250/42* (2013.01); *Y10T 428/24975* (2015.01); *Y10T 428/31797* (2015.04)

(58) Field of Classification Search
CPC ..... Y10T 428/31797; Y10T 428/24975; B29C 47/0021; B29C 47/068; B29C 47/065; B29C 47/061
See application file for complete search history.

(56) References Cited

U.S. PATENT DOCUMENTS

| | | | |
|---|---|---|---|
| 4,946,743 A * | 8/1990 | Winter | B32B 27/08 428/349 |
| 4,977,033 A | 12/1990 | Akao | |
| 5,230,701 A | 7/1993 | Meyer | |
| 5,427,842 A | 6/1995 | Bland | |
| 5,592,698 A | 1/1997 | Woods | |
| 5,604,019 A | 2/1997 | Bland | |
| 5,612,399 A | 3/1997 | Beckley | |
| 5,618,883 A | 4/1997 | Plamthottam | |
| 5,867,316 A | 2/1999 | Carlson | |
| 5,882,774 A | 3/1999 | Jonza | |
| 5,919,547 A | 7/1999 | Kocher | |
| 5,997,968 A | 12/1999 | Dries | |
| 6,157,490 A | 12/2000 | Wheatley | |
| 6,503,621 B1 | 1/2003 | Ma | |
| 7,271,951 B2 | 9/2007 | Weber | |
| 7,345,137 B2 | 3/2008 | Hebrink | |
| 2001/0016250 A1 | 8/2001 | Shetty | |
| 2002/0013415 A1 | 1/2002 | Mechelaere | |
| 2002/0068182 A1* | 6/2002 | Kelch | B32B 27/08 428/463 |
| 2003/0006814 A1 | 1/2003 | Von | |
| 2003/0068514 A1 | 4/2003 | Sperlich | |
| 2003/0152735 A1 | 8/2003 | Koike | |
| 2004/0013629 A1 | 1/2004 | Andolino Brandt | |
| 2004/0115457 A1 | 6/2004 | Kong | |
| 2004/0121105 A1* | 6/2004 | Janssen | B32B 7/06 428/40.1 |
| 2004/0209094 A1 | 10/2004 | MacKerron | |
| 2005/0008802 A1 | 1/2005 | Malfait | |
| 2005/0017397 A1 | 1/2005 | Silagy | |
| 2005/0147812 A1 | 7/2005 | Malfait | |
| 2005/0170124 A1 | 8/2005 | Takahashi | |
| 2006/0093809 A1 | 5/2006 | Hebrink | |
| 2006/0159888 A1 | 7/2006 | Hebrink | |
| 2006/0227421 A1 | 10/2006 | Stover | |
| 2006/0228092 A1* | 10/2006 | Hebrink | B32B 3/26 385/147 |
| 2006/0228592 A1 | 10/2006 | Stover | |
| 2008/0032148 A1 | 2/2008 | Lee | |
| 2010/0247824 A1* | 9/2010 | Chang | A61J 1/10 428/35.7 |
| 2010/0291396 A1 | 11/2010 | Peiffer | |
| 2010/0317802 A1 | 12/2010 | Aoyama | |
| 2011/0076452 A1 | 3/2011 | Sakagami | |
| 2011/0162993 A1 | 7/2011 | Cruz | |
| 2011/0200778 A1 | 8/2011 | Ibbotson | |
| 2011/0272832 A1 | 11/2011 | Neavin | |
| 2011/0272849 A1 | 11/2011 | Neavin | |
| 2012/0119404 A1* | 5/2012 | Wallace | B32B 38/12 264/101 |
| 2012/0137414 A1 | 6/2012 | Saylor | |
| 2013/0142975 A1 | 6/2013 | Wallace | |

FOREIGN PATENT DOCUMENTS

| | | |
|---|---|---|
| JP | 06-285945 | 10/1994 |
| JP | 2005-144979 | 6/2005 |
| JP | 2006-043996 | 2/2006 |
| JP | 2006-285945 | 10/2006 |
| JP | 2009-083176 | 4/2009 |
| JP | 2010-94781 | 4/2010 |
| JP | 2011-104981 | 6/2011 |
| WO | WO 99/32279 | 7/1999 |
| WO | WO 2009/076284 | 6/2009 |
| WO | WO 2009-105427 | 8/2009 |
| WO | WO 2010-015402 | 2/2010 |
| WO | WO 2011-140019 | 11/2011 |
| WO | WO 2012-092478 | 7/2012 |
| WO | WO 2012-123699 | 9/2012 |

OTHER PUBLICATIONS

"ProShield tear-offs, Racing Products", Pro-Tint Website [on line], [retrieved from internet on Mar. 7, 2012], URL<:http://www.protint.com/racing_tearoffs.php>, pp. 2.

Brochure by 3M Industrial Adhesives and Tapes Division, "3M™ Scotchgard™ Multi-Layer Protective Film" 2011, 2 pages.

Brochure by 3M Industrial Adhesives and Tapes Division, "3M™ Scotchgard™ Protective Film 1001, Technical Data sheet", Oct. 2011, 3 pages.

Huslage, "A Quantitative Approach to Defining "High-Touch" Surfaces in Hospitals", Infection Control and Hospital Epidemiology, Aug. 2010 vol. 31, No. 8, pp. 850-853.

Nseir, "Risk of acquiring multidrug-resistant Gram-negative bacilli from prior room occupants in the intensive care unit", Clinical Microbiology and Infection, Aug. 2011, vol. 17, No. 8, pp. 1201-1208.

Russell, "Introduction of biocides into clinical practice and the impact on antibiotic-resistant bacteria" Journal of Applied Microbiology Symposium Supplement, May 2002, vol. 92, No. Supplement s1, pp. 121S-135S.

Satar, "Promises and pitfalls of recent advances in chemical means of preventing the spread of nosocomial infections by environmental surfaces" American Journal of Infection Control, Jun. 2010, vol. 38, No. 5, Supplement. 1, pp. S34-S40.

Shaver, Film Birds Army turns to film to cut costs, Window Film, Mar./Apr. 2005,vol. 9, No. 2, pp. 1-4.

PCT International Search Report for PCT/US2013/056551, dated Nov. 21, 2013.

Shi, Yusheng et al., Polymer Molding Technology, Chemical Industry Press of China, pp. 211-212, Jul. 2006.

Wenjuan Yu, Production and design of rigid plastic packaging containers, Mar. 2009, China Textile & Apparel Press, pp. 167 (translation).

Joseph Dooley and Harvey Tung, "Co-Extrusion" Encyclopedia of Polymer Science and Technology, vol. 2, p. 1-25, Oct. 21, 2001.

ThomasNet, "Plastic Co-extrusion" May 18, 2009. https://web.archive.org/web/20090518013241/http://www.thomasnet.com/articles/plastics-rubber/plastic-coextrusion.

Hatfield et al., "Coextrusions for Flexible Packaging," Encyclopedia of Packaging Technology, Third Edition, Wiley, 2009, pp. 305-309.

John Green, "Thermoplastic Copolyesters" Mar. 13, 2008.

ShinEtsu, Silicones for Resin Modification, 2011.

Hedge et al., Polyester Fibres, 2004.

* cited by examiner

COEXTRUDED POLYMER FILM CONFIGURED FOR SUCCESSIVE IRREVERSIBLE DELAMINATION

FIELD OF THE INVENTION

This invention relates generally to polymer films, with particular application to such films having a multi-layered construction in which individual layers or groups of layers can be peeled apart or delaminated from the remainder of the construction. The invention also relates to associated articles, systems, and methods.

BACKGROUND

Polyester films (this term includes co-polyester and polyester blend, alloy, and mixture films) have been heavily utilized over the last several decades in a great variety of applications. Oriented polyester film products have been produced as roll goods in both monolayer and coextruded multilayered formats. Frequently, protective liner films (also referred to as premasks) are applied to one or both outer surfaces of such films for protective purposes. The liner film typically provides only a temporary protective function while the useful polyester film it is attached to is in transit between manufacturing facilities and/or to the customer, or being handled or processed. The liner film is designed to be removed by an in-house converting process or by the customer before or upon converting or installation of the useful polyester film by simply peeling the liner film, in sheet form, away from the useful polyester film, and then discarding or recycling the liner film. The liner film typically does not provide any functionality comparable to that of the useful polyester film. For example, if the useful polyester film is an optical polarizing film, the liner film does not provide any meaningful optical functionality or polarizing functionality.

It is also known to design some multilayered polymer films so that constituent layers or sheets, each with similar functionality, can be peeled apart or delaminated from the remainder of the film. One use for such films is in anti-graffiti applications. In such applications, the film in its original form may be applied to a mirror, window, or other item to be protected. The film is made up of highly transparent polymer materials, so that the appearance of the mirror, window, or other item is minimally affected by the film. If graffiti is applied to the exposed surface of the film, an outermost portion of the film, on which the graffiti resides, can be peeled away in continuous sheet form from the remainder of the film. After removal of the outermost portion, the remaining film stays in place on the item, which now appears clean and graffiti-free again. A portion of the film which was originally interior to the film, immediately beneath the outermost portion, becomes the new outermost layer. If graffiti is again applied, the new graffiti will reside on the exposed surface of the new outermost layer. The new graffiti can be removed by peeling away the new outermost layer in continuous sheet form from the remainder of the film. After removal of the new outermost portion, the remaining film stays in place on the item, which again appears clean and graffiti-free. The original film product can be made with up to 4 constituent sheets that can be sequentially removed in this manner to provide protection against repeated acts of defacement. To facilitate removal of only one sheet at a time, the product is made with kiss-cut tab-like features of differing depths near the edge of the film.

BRIEF SUMMARY

Known multilayered polymer films designed for delamination are typically made by first manufacturing the constituent sheets, and then laminating the sheets together with pressure sensitive adhesive (PSA) layers. This manufacturing approach, and film design, introduces inherent limitations in the types of films that can be made. For example, the constituent sheets need to be physically thick enough to allow the individual sheets to be processed by automated film-handling equipment without excessive tears or breakage. This places a lower limit on the thickness of the individual sheets, and a concomitant upper limit on the number of such sheets that can be laminated together to form a multilayered film that is sufficiently thin and flexible.

We have developed a new family of multilayered polymer films that are configured so that successive constituent layer packets can be delaminated in continuous sheet form from the remaining film. The new films are preferably compatible with known coextrusion manufacturing techniques. The new films are also preferably made without the use of adhesive layers between layer packets (sheets having a plurality of individual layers) that are tailored to be individually peelable from the remainder of the film. Instead, combinations of polymer compositions have been developed that allow non-adhesive polymer layers to be combined in such a way that delamination of the film is likely to occur along a plurality of delamination surfaces corresponding to interfaces between particular pairs of layers for which the peel strength is low, relative to the peel strength at other layer interfaces within the film. The absence of an adhesive between peelable layer packets results in the delamination being irreversible: after a layer packet is delaminated from the remainder of the film, the layer packet cannot thereafter be permanently or reliably re-affixed to the film simply by pressing the delaminated layer packet against the film.

We describe herein, inter alia, films that include a stack of polymer layers organized into layer packets. Each layer packet has a front major surface, a back major surface, and at least three of the polymer layers between the front and back major surfaces. For every pair of adjacent first and second layer packets in the stack, the first layer packet includes a backmost polymer layer that on one side thereof contacts an interior polymer layer of the first layer packet and that on an opposite side thereof contacts a frontmost polymer layer of the second layer packet, the backmost polymer layer having a weaker attachment to the frontmost polymer layer than to the interior polymer layer, such that the first layer packet tends to irreversibly delaminate from the second layer packet along a delamination surface corresponding to an interface between the backmost polymer layer and the frontmost polymer layer. Preferably, all of the polymer layers in the stack of polymer layers have respective polymer compositions that are coextrudable with each other.

The stack of polymer layers may include polymer layers A, polymer layers B, and polymer layers C composed of different polymer compositions A, B, and C, respectively, and the backmost polymer layers may have the polymer composition C. The polymer composition C may be a blend of propylene copolymer and styrenic block copolymer, or a blend of propylene copolymer and an ethylene alpha olefin copolymer, or a blend of propylene copolymer and an olefin block copolymer.

The interior polymer layer may have the polymer composition B, and the frontmost polymer layer may have the polymer composition A. The polymer composition C may be or comprise a blend of propylene copolymer and styrenic block copolymer, and the polymer composition B may be or comprise an immiscible blend of copolyester and an olefin. The polymer composition C may be or comprise a blend of propylene copolymer and styrenic block copolymer, and the polymer composition B may be or comprise an amorphous copolyester, and the polymer composition A may be or comprise a semi-crystalline polyester. The polymer composition C may be miscible (at least in part) with the polymer composition B, while the polymer composition B is miscible (at least in part) with the polymer composition A, and the polymer composition C is not miscible with the polymer composition A.

All of the polymer layers in the stack of polymer layers may have respective polymer compositions that are melt processable at a temperature of 204 degrees C. (400 degrees F.) or greater. At least some of the polymer layers in the stack may be oriented and may have a birefringence of at least 0.05. None of the polymer layers in the stack may be pressure sensitive adhesives, and further, none of the polymer layers in the stack may be adhesives.

The attachment of the backmost polymer layer to the frontmost polymer layer may be characterized by a peel force in a range from 2 to 100 grams per inch. Furthermore, the attachment of the backmost polymer layer to the frontmost polymer layer may be characterized by a first peel force, and the attachment of the backmost polymer layer to the interior polymer layer may be characterized by a second peel force, and the second peel force may be at least two times, or at least three times, the first peel force. Furthermore, the attachment of the frontmost polymer layer to the interior polymer layer may be characterized by a third peel force, and the third peel force may be at least two times, or at least three times, the first peel force.

Each of the layer packets in the stack may have a thickness of no more than about 1 mil (about 25 microns) or about 2 mils (about 50 microns). The polymer layers may be organized into at least N layer packets, where N is at least 5 or at least 10, and the film may have an overall thickness of no more than about 15 or 20 mils (about 380 or 510 microns respectively). At least N−1 of the layer packets may have a same number M of the polymer layers, wherein M is at least 3. The M polymer layers may be arranged in a sequence that is the same for the N−1 layer packets. The thicknesses mentioned here for the layer packets and for the overall film thickness are typical of many oriented films, but should not be considered to be limiting insofar as layer packets and films of greater thicknesses can be made, particularly in the case of cast (non-oriented) films.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

We have developed new polymer material combinations which, when incorporated properly in a stack of polymer layers, can be used to produce a multilayered polymer film containing numerous layer packets which can be delaminated or peeled away, one layer packet at a time, from the remaining film. These films can be made by coextruding all the polymer layers in the stack, with no need to laminate separately manufactured films or layers in order to construct the stack. This allows the individual layer packets (which can be sequentially peeled away) to be made much thinner than could otherwise be done, such that more separately peelable sheets can be included in a film of a specified overall thickness. The films can also be made without the need for any pressure sensitive adhesives, or other kinds of adhesives, in the stack of polymer layers. This can simplify manufacture and also produce film surfaces, which are interior to the film in the initial finished product but that become exterior surfaces as layer packets are peeled away during use, that are more pristine than can be achieved in a film made by using separate lamination steps.

Figure 1A:
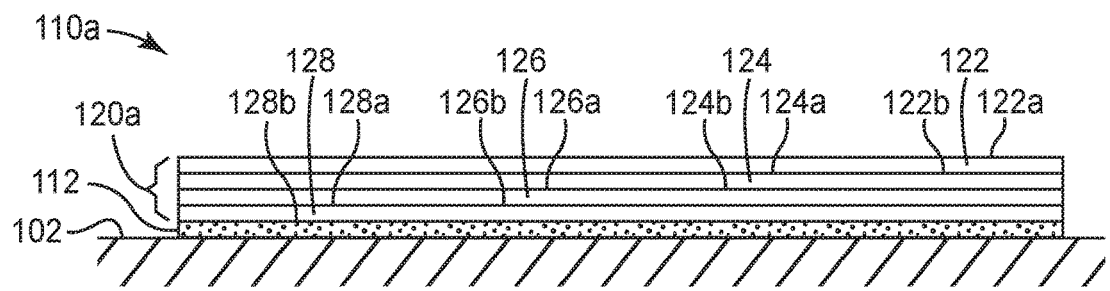
FIG. 1a is a schematic side or sectional view of a polymer film applied to a workpiece, the polymer film configured for successive irreversible delamination.

An exemplary multilayered polymer film of the type described herein is shown schematically in FIG. 1a. In this figure, film 110a is a multilayered polymer film configured so that successive constituent layer packets can be delaminated in continuous sheet form from the remaining film. The film 110a is made up of a stack 120a of polymer layers, and an adhesive backing layer 112 allowing the stack 120a to be attached to a workpiece of interest such as workpiece 102. Although the stack 120a is shown to be attached to the workpiece 102 using an adhesive, the stack itself preferably contains no adhesives. The film 110a is typically relatively thin and flexible such that it can be applied to, and conform to, workpieces that are contoured rather than flat. For example, the film 110a may have an overall thickness of no more than about 510, or 380, or 300, or 200, or 100, or even 50 micrometers. Alternatively, in some cases it may be desirable for the film 110a to be relatively thick and inflexible or rigid.

Individual polymer layers of the stack 120a are not shown in FIG. 1a, but the individual layers are organized into repeating groups of layers referred to as layer packets, and these packets are shown and labeled as layer packets 122, 124, 126, and 128. Each layer packet is characterized by a front and back major surface, and, as described further below, at least three of the individual polymer layers are disposed between the front and back major surfaces of each layer packet. Layer packet 122 has a front major surface 122a and a back major surface 122b. Layer packet 124 has a front major surface 124a (which is in intimate contact with back major surface 122b) and a back major surface 124b. Layer packet 126 has a front major surface 126a (which is in intimate contact with back major surface 124b) and a back major surface 126b. Layer packet 128 has a front major surface 128a (which is in intimate contact with back major surface 126b) and a back major surface 128b.

The reader will understand that the terms "front", "back", and the like (e.g. frontmost, backmost) are used throughout this document for convenience in order to specify the ordering of the layers with respect to outer major surfaces of the film or stack, and should not be construed in a limiting way. Thus, even for films or packets that are intended for use such that one outer major surface is to face outwardly (front) and the other outer major surface is to face inwardly (back), either of these outer major surfaces may be considered the "front", and the other outer major surface would then be considered the "back".

Some or all of the layer packets may have the same or similar number of individual polymer layers, and the arrangement of the individual polymer layers within the layer packets may be the same or similar for some or all of the layer packets. Each layer packet includes a frontmost polymer layer, a backmost polymer layer, and at least one interior polymer layer. For every pair of adjacent first and second layer packets in the stack, the backmost polymer layer of the first layer packet has one side that contacts an interior polymer layer of the first layer packet, and an opposite side that contacts the frontmost polymer layer of the second layer packet. The polymer compositions are tailored such that the backmost polymer layer has a weaker attachment to the frontmost polymer layer than to the interior polymer layer. Accordingly, the first layer packet tends to irreversibly delaminate from the second layer packet along a delamination surface corresponding to an interface between the backmost polymer layer and the frontmost polymer layer.

Figure 1B:
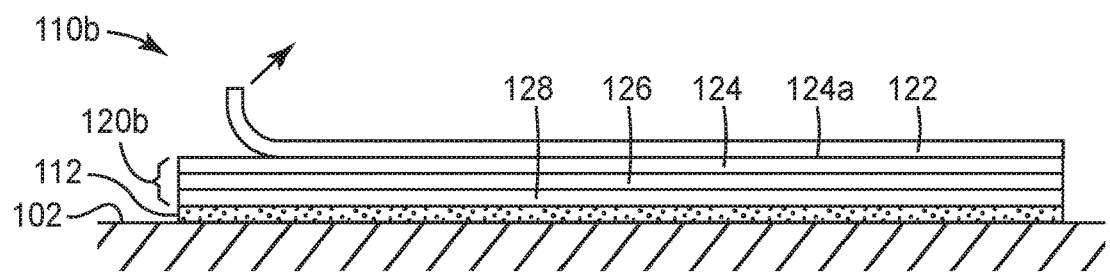
FIGS. 1b through 1e are schematic side or sectional views of the polymer film of FIG. 1a as successive layer packets are delaminated and peeled away from the film.

This is shown in the sequence of FIGS. 1b through 1e. In FIG. 1b, the film 110a of FIG. 1a becomes a modified film 110b by the removal of the uppermost or outermost layer packet 122. The layer packet 122 is delaminated from the remainder of the stack 120a in a continuous sheet form, such that a reduced layer stack 120b remains in place as part of the modified film 110b. Delamination occurs preferentially along a delamination surface corresponding to an interface between layer packet 122 and layer packet 124, and can be initiated by application of a knife or other sharp instrument to the edge of the film 110a. After removal of the layer packet 122, the layer packet 124 becomes the outermost layer packet of the film 110b, and the front major surface 124a of layer packet 124 becomes the front major surface of the film 110b, which is typically exposed to air or other ambient environment, such as water when used underwater.

Figure 1C:
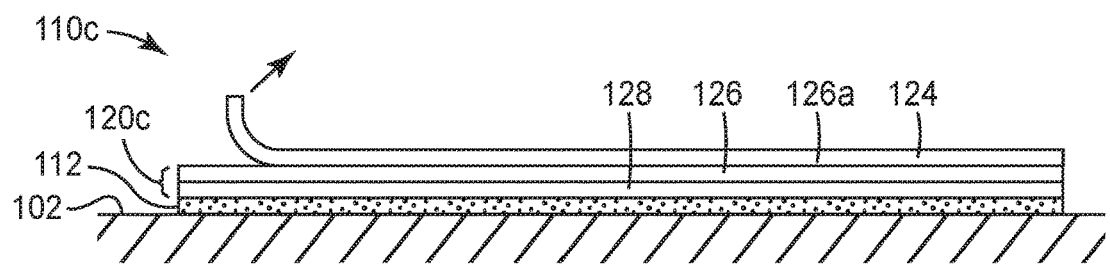

Afterwards, as shown in FIG. 1c, the outermost layer packet 124 can be removed from the film 110b to form a new modified film 110c. The layer packet 124 is delaminated from the remainder of the stack 120b in a continuous sheet form, such that a reduced layer stack 120c remains in place as part of the modified film 110c. Delamination occurs preferentially along a delamination surface corresponding to an interface between layer packet 124 and layer packet 126, and can be initiated by application of a knife or other sharp instrument to the edge of the film 110b. After removal of the layer packet 124, the layer packet 126 becomes the outermost layer packet of the film 110c, and the front major surface 126a of layer packet 126 becomes the front major surface of the film 110c, which is typically exposed to air or other ambient environment.

Figure 1D:
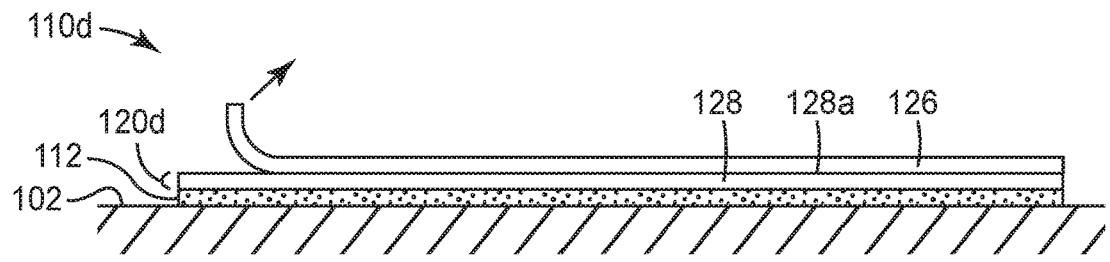

After this, as shown in FIG. 1d, the outermost layer packet 126 can be removed from the film 110c to form a new modified film 110d. The layer packet 126 is delaminated from the remainder of the stack 120c in a continuous sheet form, such that a reduced layer stack 120d remains in place as part of the modified film 110d. In this case, the layer stack 120d may contain enough individual polymer layers to form only one layer packet, i.e., layer packet 128. Delamination occurs preferentially along a delamination surface corresponding to an interface between layer packet 126 and layer packet 128, and can be initiated by application of a knife or other sharp instrument to the edge of the film 110c. After removal of the layer packet 126, the layer packet 128 becomes the outermost layer packet of the film 110d, and the front major surface 128a of layer packet 128 becomes the front major surface of the film 110d, which is typically exposed to air.

Figure 1E:
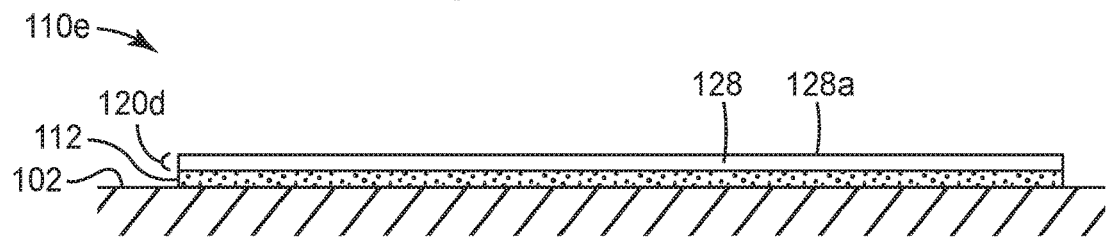

In FIG. 1e, the depicted film 110e is the same as film 110d after the complete removal of the layer packet 126. Thus, the layer stack 120d contains enough individual polymer layers to form only the layer packet 128, which remains attached to the workpiece 102 via the adhesive backing layer 112.

The reader will understand that although the original film 110a was assumed to have four layer packets, in other cases the original film may contain more than four layer packets, or, if desired, fewer than four but at least two layer packets. One benefit of making the individual polymer layers and layer packets very thin, such as can be done in a single coextrusion operation, is that many more than four layer packets, which can be removed sequentially in continuous sheet form, can be incorporated into the original film.

To facilitate the sequential removal of only one sheet at a time, the film 110a, as well as the other multilayered polymer films disclosed herein, can be made with kiss-cut tab-like features of differing depths near the edge of the film. In this regard, published international application WO 2012/092478 (Wu et al.) exemplifies ways in which laser radiation can be used to cut and subdivide polymeric multilayer film bodies without any substantial delamination at the laser cut edge lines, which may be useful in forming the desired tab-like features. The laser radiation is selected to have a wavelength at which at least some of the materials of the film have substantial absorption so that the absorbed electromagnetic radiation can effectively vaporize or ablate the film body along the cut line. The laser radiation is also shaped with suitable focusing optics and controlled to suitable power levels to accomplish the vaporization along a narrow cut line. The laser radiation can also be rapidly scanned across the workpiece according to pre-programmed instructions, and switched on and off rapidly so that cut lines of arbitrary shape can be followed.

The film 110a may be tailored for a variety of purposes and for a variety of end-use applications. In some cases, the film 110a may be an anti-graffiti film. In these cases, the film 110a, and all of its constituent components including its layer packets and the adhesive backing layer 112, may be substantially transparent, so that the workpiece to which it is applied does not change its appearance or its functionality regardless of how much of the original film is present on the workpiece at any given time.

In other cases, the film 110a may be used to provide a sterile, substantially germ-free environment in a hospital setting or the like. In this regard, another benefit of making the individual polymer layers and layer packets in a single coextrusion operation, rather than in separate manufacturing operations that involve handling, alignment, and lamination of separately manufactured films, is that the front major surfaces of the layer packets may be much more easily maintained in a pristine and sterile state, until they are exposed by the peeling away of the layer packets in front of a given layer packet. In the case of sterile end-use applications, the film 110a and its constituent components may or may not be transparent, depending on the workpieces to which it is to be applied.

In still other cases, the film 110a may be used to provide a controlled surface topography at the workpiece. For example, it may be desired to effectively provide the workpiece with a high quality smooth (low roughness) surface finish. Rather than polishing the surface of the workpiece itself, the film 110a may be applied to the workpiece to provide the needed smooth surface. In use, as the outer surface of the film becomes abraded or otherwise non-smooth, layer packets can be sequentially peeled away to restore the desired smooth surface after repeated abrasion events. In other cases, a controlled degree of roughness may be desired at the workpiece. In such cases, a controlled amount of suitably sized beads or other particles may be provided in the frontmost polymer layer of each layer packet, so that the frontmost (exposed) surface of the film has the desired amount of surface roughness. If the exposed surface should become worn down, abraded, contaminated with other materials, or the like, the desired surface roughness can be easily restored by simply peeling off the outermost layer packet to uncover the pristine surface of the immediately adjacent layer packet, which again has the desired surface roughness.

The reader will understand that the above applications are only exemplary, and that anti-graffiti films, sterile films, and controlled surface topography films are only some of a large number of possible applications of the disclosed multilayered polymer films.

Figure 2:
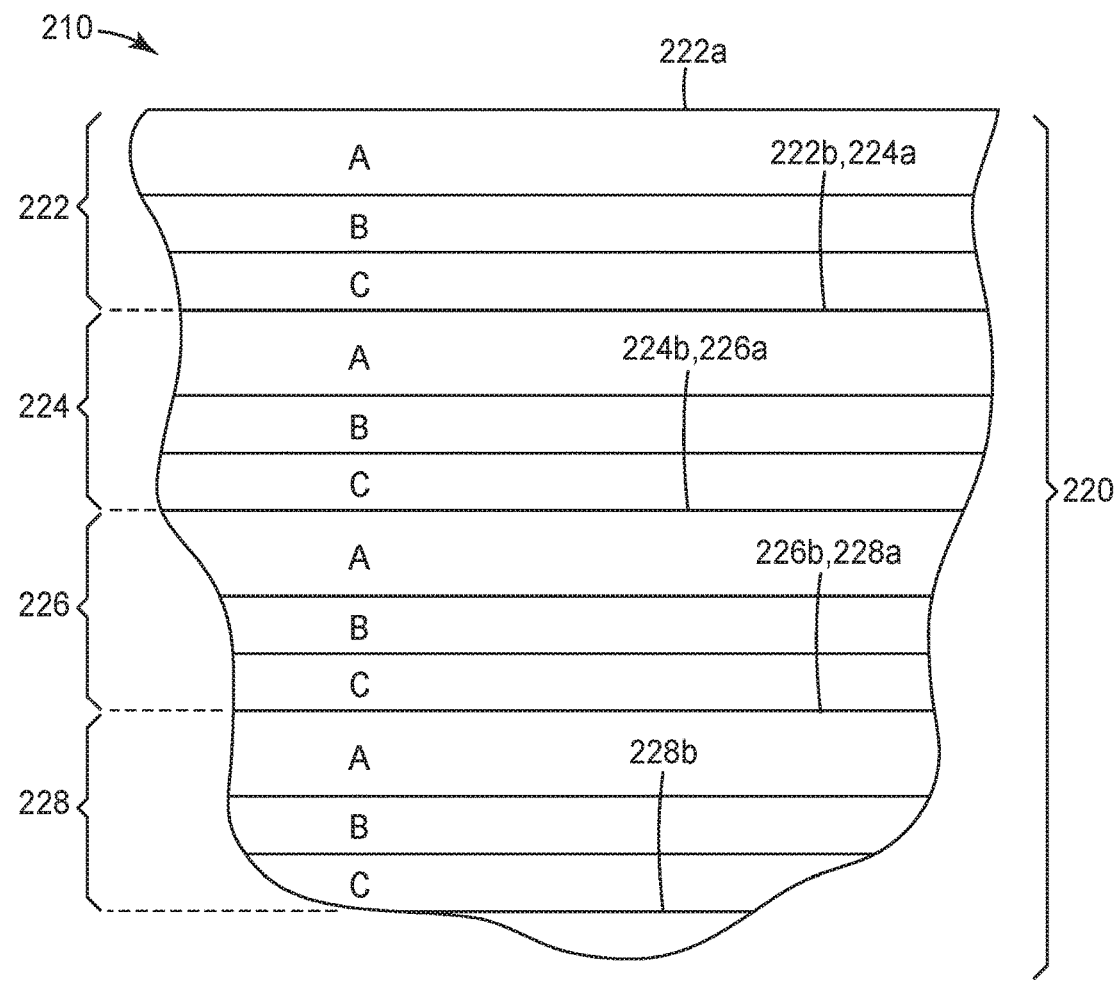
FIG. 2 is a schematic side or sectional view of a portion of a polymer film configured for successive irreversible delamination, this figure showing how the film is composed of a stack of polymer layers that are organized into 3-layer (A-B-C) layer packets.

Construction details of films such as those of FIGS. 1a-1e are provided in FIG. 2. In this figure, we see in schematic form individual polymer layers stacked together to form a stack 220 which may form all or part of a multilayered polymer film 210. In the depicted embodiment, the stack 220 is composed of only three types of polymer layers: polymer layers A, polymer layers B, and polymer layers C, which are assumed to be composed of different polymer compositions A, B, and C, respectively. These three different layer types are organized into repeating groups of layers A, B, C, A, B, C, and so forth, the smallest repeat unit (A, B, C) being referred to as a layer packet. The film 210 has at least four layer packets 222, 224, 226, and 228. Each of these layer packets is defined by a front major surface (see surfaces 222a, 224a, 226a, 228a) and a back major surface (see surfaces 222b, 224b, 226b, and 228b). The front and back major surfaces of adjacent layer packets are in intimate contact with each other. In the depicted embodiment, each of the layer packets has exactly three polymer layers disposed between the front and back major surfaces: one polymer layer A, one polymer layer B, and one polymer layer C. As shown, the A layer of a given packet is the frontmost polymer layer in the packet, the C layer is the backmost polymer layer in the packet, and the B layer is an interior layer (neither frontmost nor backmost) in the given packet.

Preferably, none of the polymer compositions A, B, and C are pressure sensitive adhesives (PSAs), or other types of adhesives. Furthermore, the polymer compositions A, B, and C are preferably coextrudable with each other, such that the entire layer stack 220 can be coextruded in a single operation rather than being made in different operations and then later laminated together with an adhesive. The polymer compositions A, B, C are also preferably melt processable at a temperatures of 204 degrees C. (400 degrees F.) or greater. In some cases, the multilayered polymer film may be made not only by coextrusion but also by one or more stretching or orienting step, such that the polymer layers A, and/or the polymer layers B, and/or the polymer layers C are oriented. Such oriented layers may have a minimum level of birefringence, e.g. a birefringence of at least 0.05.

The polymer compositions B and either A or C are also preferably polyester-based materials. In this regard, we have developed new polyester and non-polyester-based material combinations which, when incorporated properly into layers B, or A or C, respectively, in the stack 220, can cause the layer packets 222, 224, etc. to preferentially delaminate along delamination surfaces corresponding to the interfaces between adjacent layer packets (refer to the dashed lines in FIG. 2). With respect to the 3-constituent layer embodiment of FIG. 2, we have found that we can make the delamination surfaces coincide with the interfaces between the polymer C layers and the polymer A layers by making the attachment of the C layers to the A layers substantially weaker than the attachment of the C layers to the B layers, and weaker than the attachment of the B layers to the A layers. This in turn can be achieved by using a blend of polypropylene copolymer with a suitable amount of another resin for the polymer composition C. For example, polymer composition C may be a miscible blend of propylene copolymer and styrenic block copolymer, or a miscible blend of propylene copolymer and an ethylene alpha olefin copolymer, or a miscible blend of propylene copolymer and an olefin block copolymer. In cases where the polymer composition C is a miscible blend of propylene copolymer and styrenic block copolymer, the polymer composition B may be an immiscible blend of copolyester and an olefin, or the polymer composition B may be an amorphous copolyester and the polymer composition A may be a semi-crystalline polyester. In some cases, the polymer composition C may be at least partially miscible with the polymer composition B, and the polymer composition B may be at least partially miscible with the polymer composition A, but the polymer composition C may not be miscible with the polymer composition A. In this regard, a given polymer composition which is an immiscible blend of polymers, such as any of polymer compositions A, B, or C, may be said to be at least partially miscible with another polymer composition if at least one component of the immiscible blend is miscible with the another polymer composition (or with at least one component of the another polymer composition if the another polymer composition is also an immiscible blend).

Differences in degrees of miscibility among the A-B, B-C, and A-C pairs of layers is not the only way to influence the relative values of peel force among the pairs of layers. For example, the at least partial miscibility of at least one component of layer A with at least one component of layer B will tend to increase the peel force of the A-B pair, due to the increase in intermolecular entanglement across the interface between these two layers. Alternatively, the presence of macromolecular orientation, or crystallinity, or both, in at least one component of at least one of layers A and B may tend to decrease the peel force of the A-B pair. This would be due to a decrease in intermolecular entanglement across the interface between the two layers which can be caused by the decreased mobility of polymer molecules which are molecularly oriented (rather than in random coil configuration), involved in structured crystallites (rather than being in an amorphous state), or both. One or more uniaxial or biaxial stretching step(s) in the film-making process can lead to molecular orientation, crystallization, or both. Thus, for layers composed at least in part of a polymer which tends to orient, crystallize, or both, under stretching, film stretching can be an alternative or a complement to altering the composition of the layers as a means of affecting the relative values of peel force among the pairs of layers. In other words, morphology (such as degree of crystalinity), as well as composition, can be used to affect the relative peel force among pairs of layers.

The layer packets of FIG. 2 are 3-layer (A-B-C) layer packets. The reader will understand, however, that the A, B, C layers may be organized differently, and/or other layer types (e.g. polymer layers D, E, and so forth) may be added to the stack, such that the layer packets contain more than 3 individual polymer layers. For example, the A, B, C layers may be arranged in an A, B, A, B, C, A, B, A, B, C, etc. arrangement, such that each layer packet is a 5-layer group (A-B-A-B-C) of polymer layers. In this case the attachment of the C layers to the A layers is again made to be substantially weaker than the attachment of the C layers to the B layers, and weaker than the attachment of the B layers to the A layers, so that delamination surfaces are formed at interfaces between the C layers and the A layers. However, to ensure the film does not simply fall apart, attachment of the C layers to the A layers is characterized by a peel force greater than zero, e.g., the peel force is preferably at least 1 gram/inch, or at least 2 grams/inch. Peel force units of grams/inch (or grams/inch width), abbreviated g/in, are sometimes referred to as grams per linear inch, abbreviated gli. 1 g/in equals 0.3860886 N/m.

Figure 3:
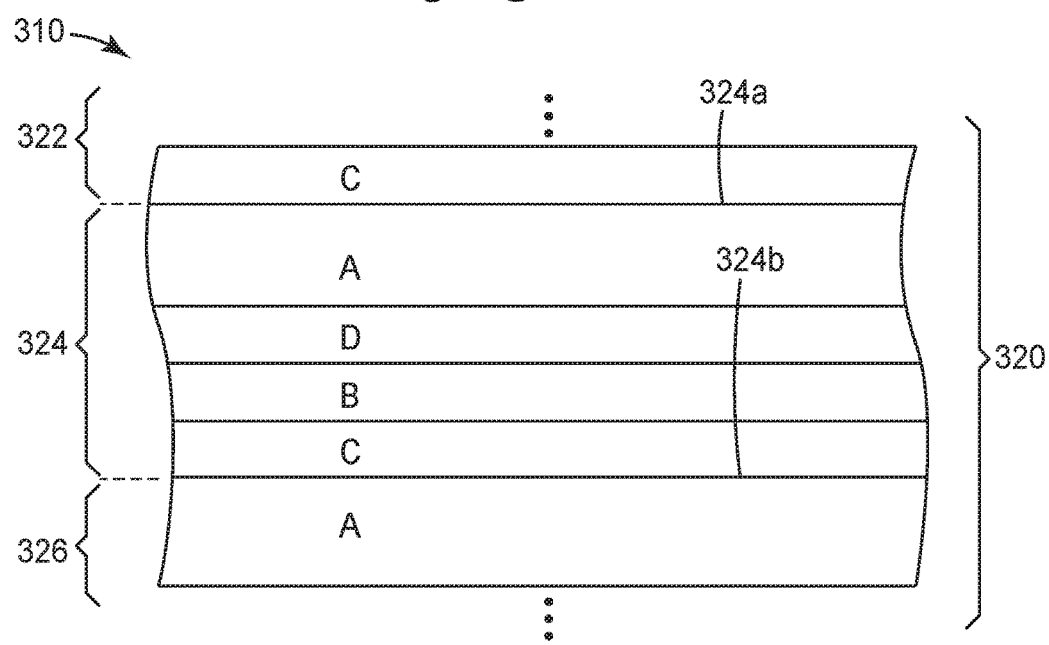
FIG. 3 is a schematic side or sectional view of a portion of a polymer film configured for successive irreversible delamination, the figure showing the polymer layers in the stack being organized into 4-layer (A-D-B-C) layer packets.

In another example, polymer layers D, assumed to be made of a polymer composition D different than compositions A, B, and C, may be added to the layer stack. Such an embodiment is shown schematically in FIG. 3. In the figure, a multilayered polymer film 310, only a portion of which is shown, contains a polymer layer stack 320. The layer stack 320 is made up of four different types of polymer layers: polymer layers A, B, C, and D, composed of different polymer compositions A, B, C, and D, respectively. None of the compositions A, B, C, D are pressure sensitive adhesives (PSAs), or other types of adhesives, and these polymer compositions are preferably coextrudable with each other, such that the entire layer stack 320 can be coextruded in a single operation. The polymer compositions A, B, C, D are also preferably melt processable at a temperatures of 204 degrees C. (400 degrees F.) or greater. Any or all of the polymer layers A, B, C, and/or D may also be oriented, and may have a birefringence of at least 0.05.

The polymer layers are organized in a repeating sequence A, D, B, C, A, D, B, C, etc., and the polymer compositions are tuned so that attachment of the C layers to the A layers is weaker than the attachment of any other adjacent layer pairs in the stack 320. In this way, the polymer layers are organized into 4-layer layer (A-D-B-C) layer packets, and delamination preferentially occurs along delamination surfaces corresponding to the interfaces between adjacent layer packets (refer to the dashed lines in FIG. 3), i.e., to the interfaces between the polymer C layers and the polymer A layers.

Figure 4:
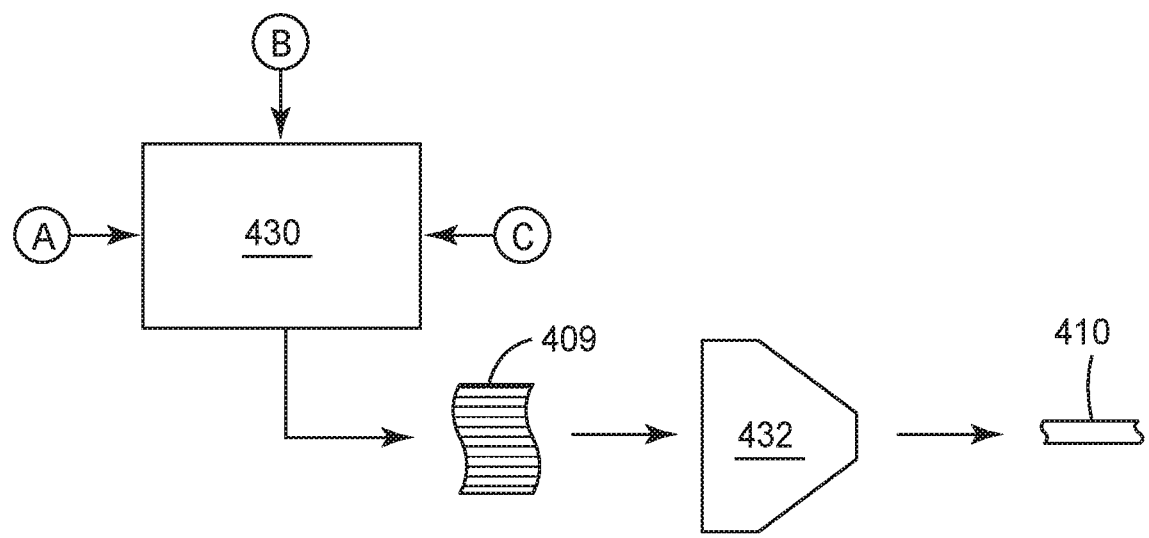
FIG. 4 is a schematic representation of a manufacturing system in which three polymer materials are coextruded to form a multilayered polymer film.
Figure 5:
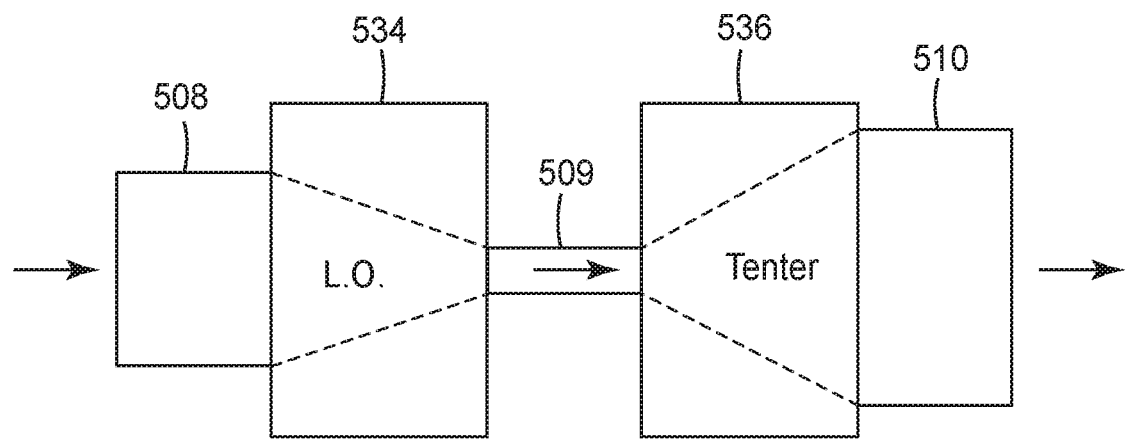
FIG. 5 is a schematic representation of film processing equipment that can be used to stretch a cast multilayered polymer film.

FIGS. 4 and 5 are schematic representations of manufacturing systems that can be used in the manufacture of the disclosed multilayered polymer films. FIG. 4 schematically depicts the coextrusion of three polymer compositions A, B, C as described elsewhere herein to form a multilayered polymer film 410. Here, the polymer compositions can be fed via twin-screw extruders or other suitable means to a feedblock 430 that interleaves the molten polymer flow paths so that they form a multilayered extrudate 409 in which the A, B, and C polymer layers are arranged in the repeating pattern desired in the finished film. In some cases, the extrudate 409 may be fed into one or more layer multiplier units to form an output extrudate having a multiple (e.g., 2×, 3×, or 4×) of the number of layers in the original extrudate 409. Whether or not layer multipliers are used, the multilayered extrudate can then be fed into a film die 432, the output of which can be quenched on a casting wheel to form a cast multilayered polymer film. In some cases, the cast film may, with no additional components, become the finished multilayered polymer film 410. In other cases, additional layers and coatings may be applied to the cast film for additional functionality. For example, a release liner may be applied to one or both exposed major surfaces of the cast film. Also, an adhesive backing layer may be coated onto one of the exposed major surfaces of the cast film so that it can be readily applied to workpieces of interest. Regardless of how many additional layers and coatings are applied, the finished multilayered polymer film 410 includes the stack of polymer layers formed by coextrusion using the feedblock 430, optional layer multiplier(s), and die 432, the layers in the stack being organized into layer packets tailored to irreversibly delaminate from each other as discussed elsewhere herein.

In some cases, it may be desirable to stretch or orient the multilayered cast film, whether to impart a birefringence to some or all of the individual layers in the film, or to change other material properties of some or all of the individual polymer layers. Such stretching or orientation is depicted schematically in FIG. 5. A multilayered cast film 508, which may be the same as or similar to the cast film 410 of FIG. 4, and which includes at least three different polymer layer types arranged in the repeating pattern desired in the finished film, may be fed into one or more known film-handling devices that stretch the film in the down-web direction and/or in the cross-web direction, whether sequentially, simultaneously, or a combination thereof, to provide an oriented multilayered polymer film 510 with the delamination characteristics described herein. In FIG. 5, the multilayered cast film 508 is shown being fed first into a length orienter (L.O.) 534, which stretches the film in the down-web direction to provide a preliminary oriented film 509, followed by a tenter 536, which stretches the film in the cross-web direction, to yield the finished oriented multilayered polymer film 510. In alternative embodiments, the length orienter 534 may be omitted, or the tenter 536 may be omitted, or additional length orienter(s) and/or tenter(s) may be added. A tenter designed to be capable of stretching the film in both the downweb and crossweb directions simultaneously (not shown) may also be used, either alone or in combination with the aforementioned stretching devices. Specially designed tenters such as so-called parabolic tenters may also be used, alone or in combination with other stretching units. In other embodiments (not shown), the cast film may be formed into a tubular rather than flat-film configuration, and the tubular cast film may then be stretched using blown film processes or the like. The methods that can be used for stretching/orienting the cast film into a stretched film are not limited.

Similar to the discussion above in connection with FIG. 4, the finished oriented film 510 may, with no additional components, become the finished multilayered polymer film whose delamination properties are discussed herein. In other cases, additional layers and coatings, such as release liner(s) and adhesive backing layer(s), may be applied to the oriented film for additional functionality. Regardless of how many additional layers and coatings are applied, the finished multilayered polymer film includes the stack of polymer layers formed originally by coextrusion, and then optionally oriented by stretching, the layers in the stack being organized into layer packets tailored to irreversibly delaminate from each other as discussed elsewhere herein.

As a result of the polymer layers in the layer stack being preferably compatible with simultaneous formation by coextrusion, as depicted in FIG. 4, the individually peelable layer packets can be made thinner than if they were manufactured separately and then laminated to each other. Preferably, each of the layer packets in the stack may have a thickness of no more than about 2 mils (about 50 microns). Furthermore, the layer stack may contain a total of N layer packets, and N may be at least 5 or at least 10, and the film may have an overall thickness of no more than about 15 or 20 mils (about 380 or 510 microns respectively). At least N−1 of the layer packets may have a same number M of the polymer layers, and M may be at least 3. The M polymer layers may be arranged in a sequence that is the same for the N−1 layer packets or for all N layer packets.

Of some importance to the ability of the disclosed films to preferentially delaminate at a particular type of interface that repeats throughout a stack of polymer layers is the appropriate selection of the polymer compositions of the various layer types within the stack. For descriptive purposes we may assume that the stack includes individual polymer layers organized into layer packets, each layer packet having a frontmost polymer layer, a backmost polymer layer, and at least one interior polymer layer. We further assume that the layer stack is tailored to preferentially delaminate at delamination surfaces corresponding to interfaces between the frontmost layer and backmost layer of adjacent layer packets. In such cases, generally, suitable compositions for the frontmost layer can be selected from polyester, copolyesters, acrylics, and silicone thermoplastics. Furthermore, suitable compositions for the backmost layer can be selected from blends of olefins such as polypropylene or polyethylene blended with suitable amounts of a styrenic block copolymer, or an ethylene alpha olefin copolymer, or an olefin block copolymer. Still further, suitable compositions for the interior polymer layer can be selected from a variety of polymers and polymer blends, including but not limited to copolyesters, PMMA, co-PMMA, styrenic block copolymers, polypropylene, and silicone polyoxamides. Note that not all combinations of the aforementioned suitable compositions for the different layer types will yield the desired results, and judgment should be used to identify appropriate combinations of the polymer materials for use in the different layer types to achieve the desired functionality and delamination characteristics. For example, the frontmost layer may be or comprise a semi-crystalline polyester, the backmost layer may be or comprise a polypropylene blended with a styrenic block copolymer, an ethylene alpha olefin copolymer, or an olefin block copolymer, and the interior layer may be or comprise a copolyester. In another example, the frontmost layer may be or comprise polymethylmethacrylate (PMMA) or co-PMMA, the backmost layer may be or comprise a blend of polypropylene and a styrenic block copolymer, and the interior layer may be a blend of PMMA or co-PMMA with a styrenic block copolymer or polypropylene. In still another example, the frontmost layer may be or comprise a silicone polyoxamide, the backmost layer may be or comprise polypropylene and a styrenic block copolymer, and the interior layer may be a styrenic block copolymer.

One approach to tailoring the attachment strength (sometimes also referred to as peel strength or peel force) of one polymer layer to other polymer layers in the layer stack will now be discussed in connection with FIG. 6. In particular, we have found that a polymer composition composed of a blend of polypropylene and one of several copolymer resins exhibits an attachment strength to other polypropylene layers that is a function of the proportion of the blended ingredients. This was determined in connection with experiments on a 5-layer film embodiment. In the experiments, 3 extruders were connected to a 5-layer feedblock. A first polymer material (referred to here as polymer composition A) was fed into one of the extruders and produced two exterior or skin layers at the output of the extruder, these layers referred to as "A" layers. A different polymer material (referred to here as polymer composition C) was fed into another one of the extruders and produced one central or core layer at the output of the extruder, this layer referred to as a "C" layer. Still another polymer material (referred to here as polymer composition B) was fed into the remaining extruder and produced two interior layers at the output of the extruder, these layers referred to as "B" layers. The "A", "B", and "C" layers were arranged in a 5-layer structure in the sequence ABCBA. The 5-layer extrudate flowed into an 8 inch die and was cast onto a chilled casting wheel with electrostatic pinning. In the experiments, the polymer compositions A and B were held constant and the polymer composition C was changed from one run to the next. Also in the experiments, the cast film was uniaxially stretched, and then the peel force value between the central "C" layer and the adjacent "B" layers was measured for the resultant stretched film using a standard 90 degree peel test.

In each of the experiments, the polymer composition A was a 0.48 intrinsic viscosity coPEN resin (90 mol % naphthalenedicarboxylic acid, NDC, 10 mol % dimethyl terephthalate, DMT), which was fed into its extruder at a rate of 20 pounds/hour (9.1 kg/hr). In each of the experiments, the polymer composition B was a PETg copolyester (product code EASTAR GN071 from Eastman Chemical Co., Kingsport, Tenn., USA), which was fed into its extruder at a rate of 5 pounds/hour (2.3 kg/hr). In each of the experiments, the polymer composition C (which was different for each film run) was fed into its extruder at a rate of 5 pounds/hr (2.3 kg/hr). The extruders, die, and feedblock in these experiments were all heated to temperatures of 520 to 530 degrees F. (271 to 277 C). In each of the experiments, the 5-layer cast web was about 20 mils (about 510 microns) thick, and was uniaxially oriented (stretched) in a KARO stretcher to 500%×100% of original dimensions at a temperature of about 135 degrees C. This produced a 5-layer oriented film having a thickness of about 4 mils (about 100 microns). For each of the film runs, the peel strength of the 4 mil thick oriented film was tested, the peel strength being indicative of the peel force value between the central "C" layer and the adjacent "B" layers.

In an initial control or baseline run, the polymer composition C was a polypropylene/polyethylene copolymer (product code PP8650 from Total Petrochemicals, Inc., Houston, Tex., USA). In this control run, the peel force was measured to be 0 g/in (0 N/m).

Then, in one group of experiments, the polymer composition C was changed to be a blend of the polypropylene/polyethylene copolymer and an olefin block copolymer resin. The particular olefin block copolymer used was product code INFUSE D9500 from The Dow Chemical Company, Midland, Mich., USA). In this group of experiments, film runs were carried out in which the amount of the olefin block copolymer was 10% (0.5 pounds/hr (0.23 kg/hr) of the olefin block copolymer, 4.5 pounds/hr (2.04 kg/hr) of the polypropylene/polyethylene copolymer), 20% (1 pound/hr (0.45 kg/hr) of the olefin block copolymer, 4 pounds/hr (1.81 kg/hr) of the polypropylene/polyethylene copolymer), and 50% (2.5 pounds/hr (1.13 kg/hr) of the olefin block copolymer, 2.5 pounds/hr (1.13 kg/hr) of the polypropylene/polyethylene copolymer). The measured peel force for these runs was 6, 12, and 47 g/in (2.3, 4.6, 18.1 N/m) respectively. These results are shown as curve 610 in FIG. 6.

In another group of experiments, the polymer composition C was changed to be a blend of the polypropylene/polyethylene copolymer and an ethylene/octene copolymer resin. The particular ethylene/octene copolymer used was product code EXACT 8201 (from ExxonMobil Chemical Company, Houston, Tex., USA). In this group of experiments, film runs were carried out in which the amount of the olefin block copolymer was 10% (0.5 pounds/hr (0.23 kg/hr) of the ethylene/octene copolymer, 4.5 pounds/hr (2.04 kg/hr) of the polypropylene/polyethylene copolymer), 20% (1 pound/hr (0.45 kg/hr) of the ethylene/octene copolymer, 4 pounds/hr (1.81 kg/hr) of the polypropylene/polyethylene copolymer), 30% (1.5 pound/hr (0.68 kg/hr) of the ethylene/octene copolymer, 3.5 pounds/hr (1.59 kg/hr) of the polypropylene/polyethylene copolymer), 50% (2.5 pounds/hr (1.13 kg/hr) of the ethylene/octene copolymer, 2.5 pounds/hr (1.13 kg/hr) of the polypropylene/polyethylene copolymer), and 75% (3.75 pounds/hr (1.70 kg/hr) of the ethylene/octene copolymer, 1.25 pounds/hr (0.57 kg/hr) of the polypropylene/polyethylene copolymer). The measured peel force for these runs was 3, 7, 11, 7, and 114 g/in (1.2, 2.7, 4.2, 2.7, 44.0 N/m) respectively. These results are shown as curve 612 in FIG. 6.

In another group of experiments, the polymer composition C was changed to be a blend of the polypropylene/polyethylene copolymer and a styrene ethylene propylene styrene (SEPS) block copolymer resin. The particular SEPS block copolymer used was product code KRATON G1730 (from Kraton Performance Polymers Inc., Houston, Tex., USA). In this group of experiments, film runs were carried out in which the amount of the SEPS block copolymer was 10% (0.5 pounds/hr (0.23 kg/hr) of the SEPS block copolymer, 4.5 pounds/hr (2.04 kg/hr) of the polypropylene/polyethylene copolymer), 20% (1 pound/hr (0.45 kg/hr) of the SEPS block copolymer, 4 pounds/hr (1.81 kg/hr) of the polypropylene/polyethylene copolymer), 50% (2.5 pounds/hr (1.13 kg/hr) of the SEPS block copolymer, 2.5 pounds/hr (1.13 kg/hr) of the polypropylene/polyethylene copolymer), and 100% (5 pounds/hr (2.27 kg/hr) of the SEPS block copolymer, 0 pounds/hr (0 kg/hr) of the polypropylene/polyethylene copolymer). The measured peel force for these runs was 7, 10, 57, and 2000 g/in (2.7, 3.9, 22.0, 772.2 N/m) respectively. These results (except for the 100% run) are shown as curve 614 in FIG. 6.

Figure 6:
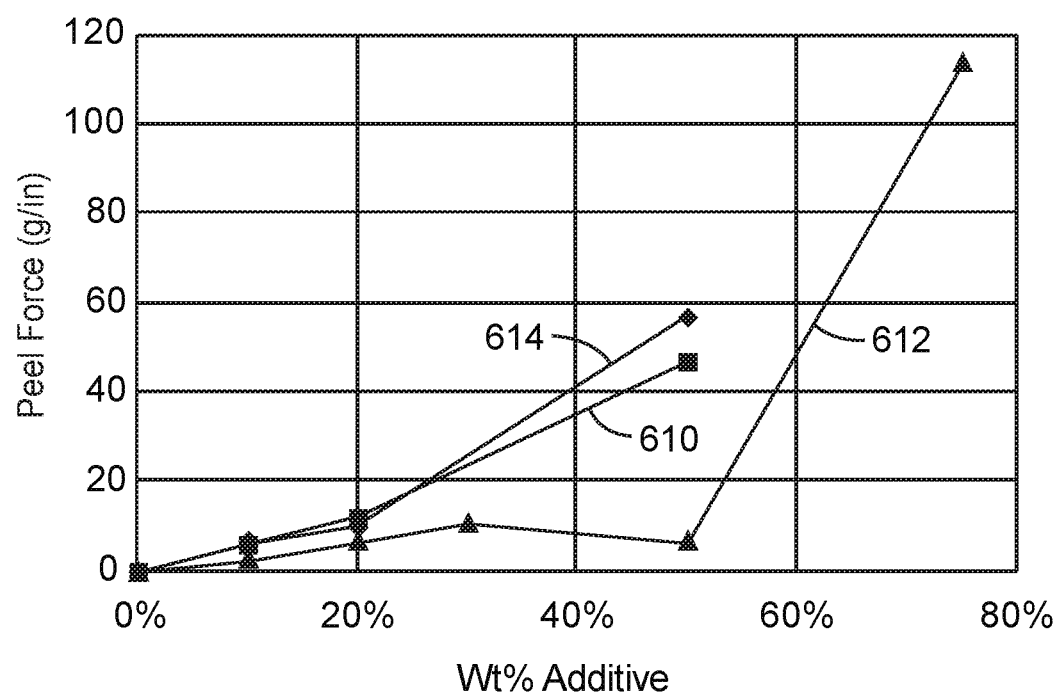
FIG. 6 is a graph of test results showing peel strength as a function of polymer composition, where the layer under test was, in some cases, a blend of polypropylene and an olefin block copolymer resin, and in other cases, a blend of polypropylene and an ethylene/octene copolymer resin, and in other cases, a blend of polypropylene and a styrene ethylene propylene styrene (SEPS) block copolymer resin.

The curves 610, 612, 614 in FIG. 6 confirm that a polymer composition composed of a blend of polypropylene and one of several copolymer resins exhibits an attachment strength to other polypropylene layers that is a function of the proportion of the blended ingredients.

EXAMPLES

The foregoing principles were used to fabricate several multilayered polymer films having the delamination properties discussed herein.

Figure 7:
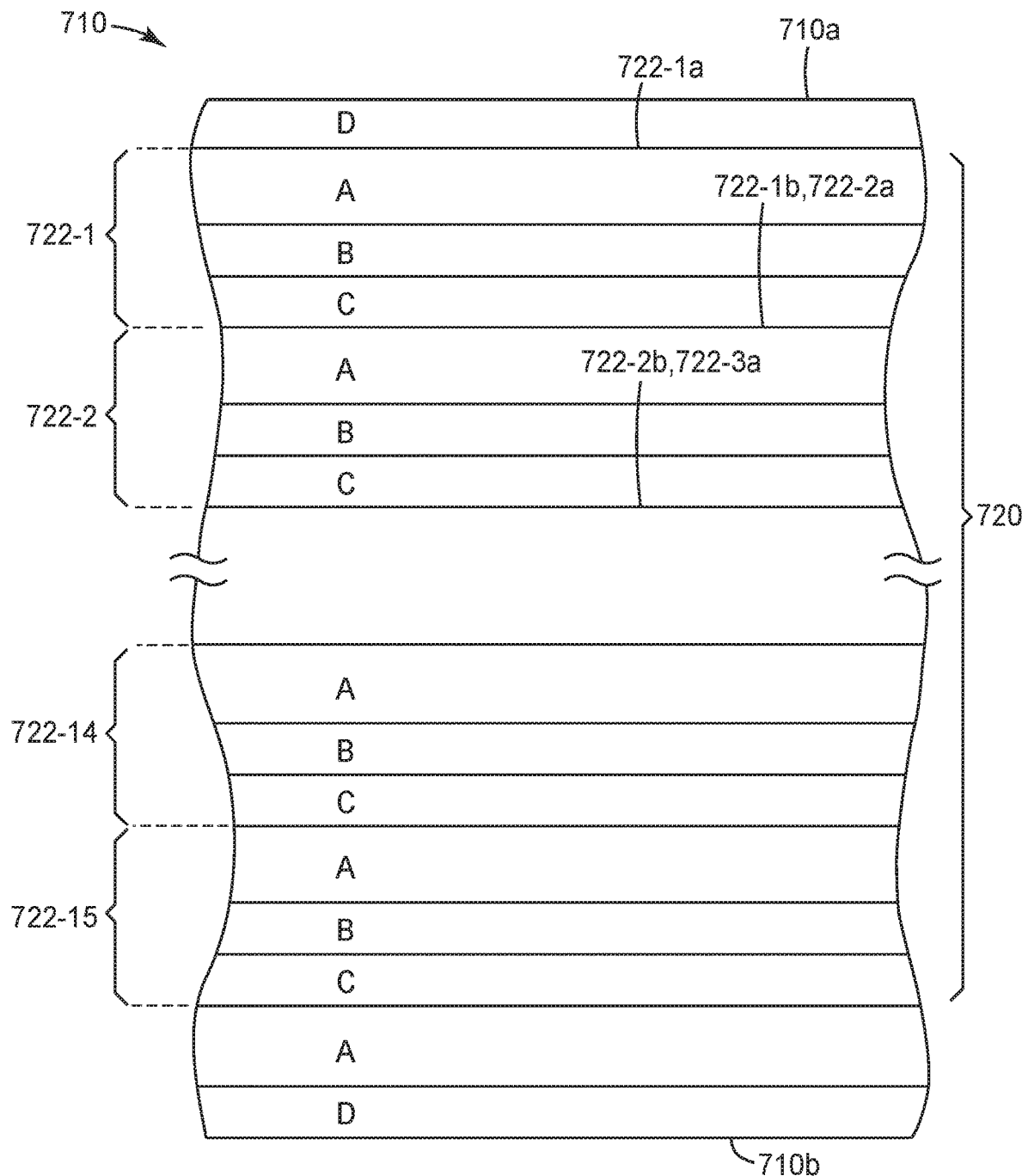
FIG. 7 is a schematic side or sectional view of a multilayered polymer film configured for successive irreversible delamination, which was fabricated using a variety of polymer compositions, and tested.

In the examples, multilayered polymer films were made that had the structure shown schematically in FIG. 7. Referring to that figure, the polymer film 710 included a stack 720 of non-adhesive polymer layers A, B, and C organized as shown to form 15 distinct layer packets, which are labeled 722-1, 722-2, ..., 722-14, and 722-15 in FIG. 7. Each of these layer packets was a 3-layer (A-B-C) layer stack, and included one frontmost major surface (722-1a, 722-2a, 722-3a, etc.) and one backmost major surface (722-1b, 722-2b, etc.). The 15 layer stacks accounted for 45 individual polymer layers. One additional polymer layer A was added at the bottom of the stack 720, for a total of 46 individual polymer layers. In the manufactured film, these 46 layers were provided by a 46-layer feedblock. The feedblock was fed by 3 extruders—one containing polymer composition A, one containing polymer composition B, and one containing polymer composition C. One additional extruder, containing a polymer composition D, fed a skin layer block which delivered one polymer layer D to opposite sides of the 46-layer combination, as shown, to form a 48-layer combination. The 48-layer combination flowed into an 8 inch (approx. 200 mm) die, and was cast onto a chilled casting wheel with electrostatic pinning. In all cases the polymer compositions A, B, and C were all distinctly different from each other. However, in some cases the polymer composition D was different from the other three polymer compositions, while in other cases the polymer composition D was the same as the polymer composition A. In the latter cases, the 48-layer combination became a 46-layer combination due to the merging of the outer pairs of A and D layers as a result of having the same polymer composition.

The polymer compositions A, B, and C were all coextrudable with each other, and were all melt processable at a temperature of 204 C (400 degrees F.) or greater. The extruders, die, and feedblock were heated to temperatures of 500 to 530 degrees F. (260 to 277 C) during the extrusion of the samples described in these examples.

In the examples, multilayered cast webs or films of these layer combinations were made at different thicknesses by controlling the speed of the casting wheel. In most cases (Examples 1, 2, 4, and 5), the cast webs were also oriented by biaxial stretching. The resulting cast (Example 3) or stretched (Examples 1, 2, 4, and 5) films were evaluated for peel strength at various interfaces within the polymer stack using a standard 90 degree peel test.

Example 1

In Example 1, the following polymer compositions and extruder flow rates were used:
- polymer composition A: PET resin of intrinsic viscosity 0.60, at a flow rate of 15 pounds/hr (6.8 kg/hr);
- polymer composition B: PETg copolyester (product code EASTAR GN071 from Eastman Chemical Co., Kingsport, Tenn., USA), at a flow rate of 5 pounds/hr (2.3 kg/hr);
- polymer composition C: a blend of a polypropylene/polyethylene copolymer (product code PP8650 from Total Petrochemicals, Inc., Houston, Tex., USA), at 70 wt % (flow rate of 7 pounds/hr (3.2 kg/hr)), and a styrene ethylene propylene styrene (SEPS) block copolymer resin (product code KRATON G1657 from Kraton Performance Polymers Inc., Houston, Ill., USA), at 30 wt % (flow rate of 3 pounds/hr (1.4 kg/hr)); and
- polymer composition D: same as polymer composition A, but at a flow rate of 10 pounds/hr (4.5 kg/hr).

These materials were used to make a cast web film as described above. The cast web film had a thickness of about 40 mils (about 1000 microns). The cast film was then biaxially stretched in a KARO IV laboratory film stretcher (Bruckner Maschinenbau, Siegsdorf, Germany) to 350%× 350% of original dimensions at 100 degrees C. The biaxial stretching caused the polymer layers A to become birefringent, while the polymer layers B and C remained substantially amorphous or isotropic. The resulting stretched film was 3.25 mils (83 microns) thick, and had an optical haze of less than 5%. The film was evaluated for peel strength.

The peel force was measured at different layer interfaces within the stack of the stretched film, with the following results:
- interface between polymer layers A,B: greater than 1000 g/in (386 N/m);
- interface between polymer layers B,C: 35.5 g/in (13.7 N/m);
- interface between polymer layers C,A: 12.5 g/in (4.8 N/m).

These tests confirmed that the attachment of the polymer layers C to the polymer layers A was substantially weaker than attachment of the polymer layers C to the polymer layers B, and substantially weaker than attachment of the polymer layers A to the polymer layers B. In the film of this Example 1, irreversible delamination was observed to occur preferentially at delamination surfaces corresponding to the interfaces between the polymer layers C,A, such that individual layer packets could be peeled away successively in continuous sheet form from the remaining film.

Example 2

In Example 2, the following polymer compositions and extruder flow rates were used:
- polymer composition A: PET resin of intrinsic viscosity 0.60, at a flow rate of 10 pounds/hr (4.5 kg/hr);
- polymer composition B: a blend of a polypropylene/polyethylene copolymer (product code PP8650 from Total Petrochemicals, Inc., Houston, Tex., USA), at 70 wt % (flow rate of 7 pounds/hr (3.2 kg/hr)), and a styrene ethylene propylene styrene (SEPS) block copolymer resin (product code KRATON G1645 from Kraton Performance Polymers Inc., Houston, Tex., USA), at 30 wt % (flow rate of 3 pounds/hr (1.4 kg/hr));
- polymer composition C: a blend of a polypropylene/polyethylene copolymer (product code PP8650 from Total Petrochemicals, Inc., Houston, Tex., USA), at 90 wt % (flow rate of 9 pounds/hr (4.1 kg/hr)), and a styrene ethylene propylene styrene (SEPS) block copolymer resin (product code KRATON G1645 from Kraton Performance Polymers Inc., Houston, Tex., USA), at 10 wt % (flow rate of 1 pound/hr (0.45 kg·hr)); and
- polymer composition D: same as polymer composition A, and also at a flow rate of 10 pounds/hr (4.5 kg/hr).

These materials were used to make a cast web film as described above. The cast web film had a thickness of about 40 mils (about 1000 microns). The cast film was then biaxially stretched in a KARO IV laboratory film stretcher (Bruckner Maschinenbau, Siegsdorf, Germany) to 350%× 350% of original dimensions at 100 degrees C. The biaxial stretching caused the polymer layers A to become birefringent, while the polymer layers B and C remained substantially amorphous or isotropic. The resulting stretched film was 3.25 mils (83 microns) thick, and had an optical haze of less than 5%. The film was evaluated for peel strength.

The peel force was measured at different layer interfaces within the stack of the stretched film, with the following results:
- interface between polymer layers A,B: 62 g/in (23.9 N/m);
- interface between polymer layers B,C: greater than 1000 g/in (386 N/m);
- interface between polymer layers C,A: 16.4 g/in (6.3 N/m).

These tests confirmed that the attachment of the polymer layers C to the polymer layers A was substantially weaker than attachment of the polymer layers C to the polymer layers B, and substantially weaker than attachment of the polymer layers A to the polymer layers B. In the film of this Example 2, irreversible delamination was observed to occur preferentially at delamination surfaces corresponding to the interfaces between the polymer layers C,A, such that individual layer packets could be peeled away successively in continuous sheet form from the remaining film.

Example 3

In Example 3, the following polymer compositions and extruder flow rates were used:
- polymer composition A: a methylmethacrylate/ethylacrylate (MMA/EA) co-polymethylmethacrylate (coPMMA) (product code ATOGLAS 510A from Arkema Inc., King of Prussia, Pa., USA), at a flow rate of 5 pounds/hr 2.3 kg/hr);
- polymer composition B: a styrene ethylene propylene styrene (SEPS) block copolymer resin (product code KRATON G1645 from Kraton Performance Polymers Inc., Houston, Tex., USA), at a flow rate of 10 pounds/hr (4.5 kg/hr);
- polymer composition C: a blend of a polypropylene/polyethylene copolymer (product code PP8650 from Total Petrochemicals, Inc., Houston, Tex., USA), at 80 wt % (flow rate of 8 pounds/hr (3.6 kg/hr)), and a styrene ethylene propylene styrene (SEPS) block copolymer resin (product code KRATON G1645 from Kraton Performance Polymers Inc., Houston, Tex., USA), at 20 wt % (flow rate of 2 pounds/hr (0.91 kg/hr)); and
- polymer composition D: a polypropylene/polyethylene copolymer (product code PP8650 from Total Petrochemicals, Inc., Houston, Tex., USA), at a flow rate of 10 pounds/hr (4.5 kg/hr).

These materials were used to make a cast web film as described above. The cast web film had a thickness of about 40 mils (about 1000 microns). The cast web film was not stretched, thus, the polymer layers A, B, and C all remained substantially amorphous or isotropic. The outer "D" layers of this cast film were stripped off, leaving a 30 mil (760 micron) thick cast film, which had an optical haze of less than 5%. This cast film was evaluated for peel strength.

The peel force was measured at different layer interfaces within the stack of the cast film, with the following results:
- interface between polymer layers A,B: 34.3 g/in (13.2 N/m);
- interface between polymer layers B,C: greater than 1000 g/in (386 N/m);
- interface between polymer layers C,A: 10.3 g/in (4.0 N/m).

These tests confirmed that the attachment of the polymer layers C to the polymer layers A was substantially weaker than attachment of the polymer layers C to the polymer layers B, and substantially weaker than attachment of the polymer layers A to the polymer layers B. In the film of this Example 3, irreversible delamination was observed to occur preferentially at delamination surfaces corresponding to the interfaces between the polymer layers C,A, such that individual layer packets could be peeled away successively in continuous sheet form from the remaining film.

Example 4

In Example 4, the following polymer compositions and extruder flow rates were used:
- polymer composition A: PET resin of intrinsic viscosity 0.60, at a flow rate of 15 pounds/hr (6.8 kg/hr);
- polymer composition B: an immiscible blend of a polypropylene/polyethylene copolymer (product code PP8650 from Total Petrochemicals, Inc., Houston, Tex., USA), at 20 wt % (flow rate of 1.5 pounds/hr (0.68 kg/hr)), and a PETg copolyester (product code EASTAR GN071 from Eastman Chemical Co., Kingsport, Tenn., USA), at 80 wt % (flow rate of 6 pounds/hr (2.7 kg/hr));
- polymer composition C: a blend of a polypropylene/polyethylene copolymer (product code PP8650 from Total Petrochemicals, Inc., Houston, Tex., USA), at 90 wt % (flow rate of 6.8 pounds/hr (3.1 kg/hr)), and a styrene ethylene propylene styrene (SEPS) block copolymer resin (product code KRATON G1645 from Kraton Performance Polymers Inc., Houston, Tex., USA), at 10 wt % (flow rate of 0.7 pounds/hr (0.32 kg/hr)); and
- polymer composition D: same as polymer composition A, but at a flow rate of 10 pounds/hr (4.5 kg/hr).

The polymer composition A was partially miscible with the polymer composition B, and the polymer composition B was partially miscible with the polymer composition C, but the polymer composition A was not miscible with the polymer composition C. These materials were used to make a cast web film as described above. The cast web film had a thickness of about 20 mils (about 500 microns). The cast film was then biaxially stretched in a KARO IV laboratory film stretcher (Bruckner Maschinenbau, Siegsdorf, Germany) to 350%×350% of original dimensions at 100 degrees C. The biaxial stretching caused the polymer layers A to become birefringent, while the polymer layers B and C remained substantially amorphous or isotropic. The resulting stretched film was 3.25 mils (83 microns) thick, and had an optical haze of more than 5% but less than 10%. The film was evaluated for peel strength.

The peel force was measured at different layer interfaces within the stack of the stretched film, with the following results:
- interface between polymer layers A,B: greater than 1000 g/in (386 N/m);
- interface between polymer layers B,C: 11.6 g/in (4.5 N/m);
- interface between polymer layers C,A: 5.5 g/in (2.1 N/m).

These tests confirmed that the attachment of the polymer layers C to the polymer layers A was substantially weaker than attachment of the polymer layers C to the polymer layers B, and substantially weaker than attachment of the polymer layers A to the polymer layers B. In the film of this Example 4, irreversible delamination was observed to occur preferentially at delamination surfaces corresponding to the interfaces between the polymer layers C,A, such that individual layer packets could be peeled away successively in continuous sheet form from the remaining film.

Example 5

In Example 5, the following polymer compositions and extruder flow rates were used:
- polymer composition A: PET resin of intrinsic viscosity 0.60, at a flow rate of 10 pounds/hr (4.5 kg/hr);
- polymer composition B: PETg copolyester (product code EASTAR GN071 from Eastman Chemical Co., Kingsport, Tenn., USA), at a flow rate of 10 pounds/hr (4.5 kg/hr);
- polymer composition C: a blend of a polypropylene/polyethylene copolymer (product code PP8650 from Total Petrochemicals, Inc., Houston, Tex., USA), at 70 wt % (flow rate of 7 pounds/hr (3.2 kg/hr)), and an ethylene alpha olefin (ethylene octene) copolymer resin (product code EXACT 8201 from ExxonMobil Chemical Company, Houston, Tex., USA), at 30 wt % (flow rate of 3 pounds/hr (1.4 kg/hr)); and
- polymer composition D: same as polymer composition A, also at a flow rate of 10 pounds/hr (4.5 kg/hr).

These materials were used to make a cast web film as described above. The cast web film had a thickness of about 40 mils (about 1000 microns). The cast film was then biaxially stretched in a KARO IV laboratory film stretcher (Bruckner Maschinenbau, Siegsdorf, Germany) to 350%× 350% of original dimensions at 100 degrees C. The biaxial stretching caused the polymer layers A to become birefringent, while the polymer layers B and C remained substantially amorphous or isotropic. The resulting stretched film was 3.25 mils (83 microns) thick, and had an optical haze of less than 5%. The film was evaluated for peel strength.

The peel force was measured at different layer interfaces within the stack of the stretched film, with the following results:
- interface between polymer layers A,B: greater than 1000 g/in (386 N/m);
- interface between polymer layers B,C: 7.5 g/in (2.9 N/m);
- interface between polymer layers C,A: 3.7 g/in (1.4 N/m).

These tests confirmed that the attachment of the polymer layers C to the polymer layers A was substantially weaker than attachment of the polymer layers C to the polymer layers B, and substantially weaker than attachment of the polymer layers A to the polymer layers B. In the film of this Example 5, irreversible delamination was observed to occur preferentially at delamination surfaces corresponding to the interfaces between the polymer layers C,A, such that individual layer packets could be peeled away successively in continuous sheet form from the remaining film.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A film comprising:
    a co-extruded stack of polymer layers, the polymer layers being organized into layer packets, each layer packet comprising a first layer, a second layer, and a third layer, the second layer being disposed between the first layer and the third layer;
    a packet interface between first and third layers of adjacent layer packets, the packet interface exhibiting a first peel force of 1 g/inch or greater; and
    layer interfaces between adjacent first and second layers and adjacent second and third layers, the layer interfaces exhibiting a second peel force that is greater than the first peel force,
    wherein the first layer has a first composition comprising a semi-crystalline polyester;
    the second layer has a second composition different from the first composition and comprises a copolyester or styrenic block copolymer; and
    the third layer has a third composition different from the first and second compositions and comprises a blend of olefin and styrenic block copolymer,
    wherein the layer packets are separately irreversibly peelable from a remainder of the stack.

2. The film of claim 1, wherein the third composition is at least partially miscible with the second composition, the second composition is at least partially miscible with the first composition, and the third composition is not miscible with the first composition.

3. The film of claim 1, wherein at least some of the polymer layers in the co-extruded stack are oriented and have a birefringence of at least 0.05.

4. The film of claim 1, wherein each of the layer packets in the co-extruded stack has a thickness of no more than 50 microns.

5. The film of claim 1, wherein the second peel force is at least three times the first peel force.

6. The film of claim 1, wherein the first layer comprises polyethylene terephthalate.

7. The film of claim 1, wherein the second layer comprises PETg copolyester.

8. The film of claim 1, wherein the third layer comprises styrene ethylene propylene styrene block copolymer.

9. The film of claim 1, wherein one or more of the layers are uniaxially or biaxially stretched.

10. The film of claim 1, wherein the film comprises a plurality of kiss-cut tabs with differing depths.

11. The film of claim 1, wherein at least a portion of the film is sterile.

12. The film of claim 1, wherein the film comprises an anti-graffiti film.

13. The film of claim 1, wherein the film comprises an adhesive backing layer.

14. The film of claim 1, wherein the film comprises a release liner.

* * * * *